Dec. 8, 1970     P. A. MULLER     3,546,325
METHOD OF MANUFACTURING FILTER ROPES
Filed Nov. 19, 1968
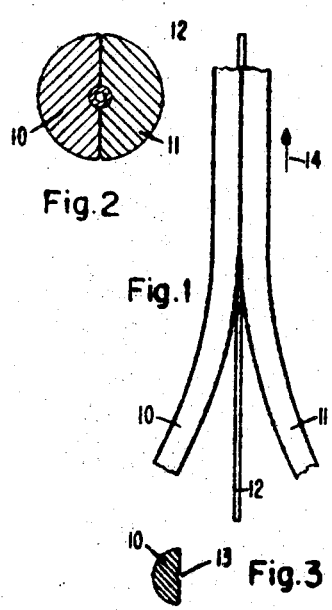
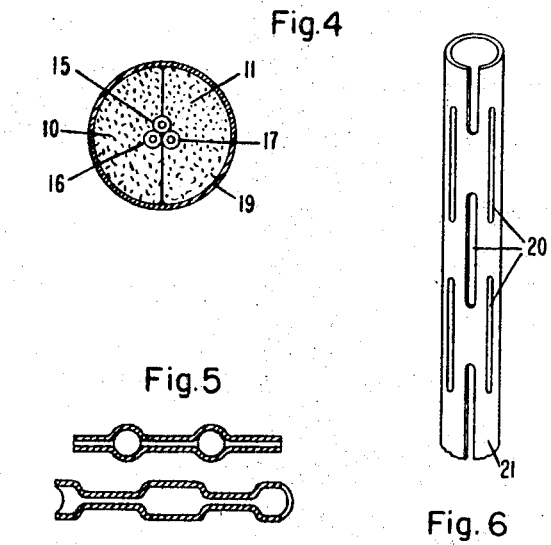
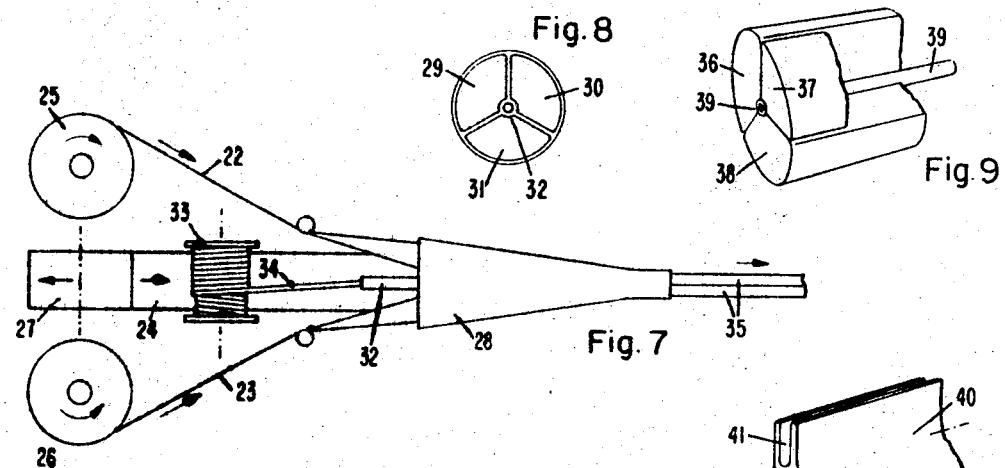
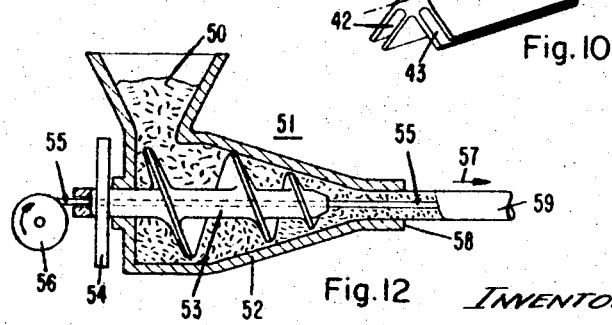
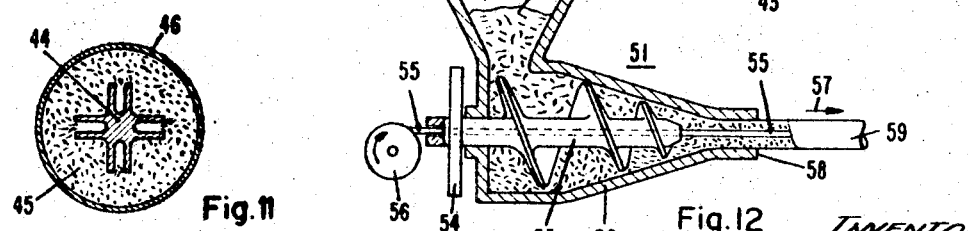
INVENTOR
PAUL A. MULLER
ATTORNEYS United States Patent Office 3,546,325
Patented Dec. 8, 1970

3,546,325
METHOD OF MANUFACTURING FILTER ROPES
Paul Adolf Muller, Triesenberg, Liechtenstein, assignor to Celfil Company Establishment, Vaduz, Liechtenstein, a corporation of Liechtenstein
Continuation-in-part of application Ser. No. 476,099, July 30, 1965. This application Nov. 19, 1968, Ser. No. 789,628
Int. Cl. A24c 5/50; B29d 27/00; B29f 3/10
U.S. Cl. 264—47     6 Claims

ABSTRACT OF THE DISCLOSURE

A method of forming an endless filter rope is disclosed wherein a supply of endless lengths of gas-permeable filtering material is assembled about at least one substantially endless core having at least one unobstructed capillary duct extending longitudinally thereof but other than said duct being gas-impermeable, shaping the assembly into a cylindrical rod-like configuration, adjusting the cross-sectional area of the running lengths of filtering material to preserve continuously along the running length thereof the said gas-permeability of the filtering material while minimizing the formation of unobstructed longitudinal channels therebetween and finally enclosing the resultant cylindrical assembly in a wrapper.

---

This application is a continuation-in-part of my application Ser. No. 476,099, filed July 30, 1965, now abandoned.

The present invention relates to the manufacture of filter ropes and filter plugs for tobacco products, particularly for filter-tip cigarettes, which have continuous capillary ducts and to a method of embedding capillary bodies provided with capillary ducts in a filling of filtering material. Filter plugs with continuous capillary ducts have been disclosed in the applicant's co-pending application Ser. No. 476,034, now abandoned, and, inter alia, in an embodiment where capillary bodies provided with capillary ducts are embedded in a filling of filtering material. The mass production of cigarettes with filter plugs requires filter rods of which the length is a certain multiple of the plug length. In order rationally to manufacture such filter rods, an endless filter rope must be produced which can be subdivided into any lengths. Several methods are known of producing an endless filter rope with a homogeneous filling of filtering material, but they are not suitable for embedding bodies having one or several capillary ducts in the filling material when the filter rope is being produced. More particularly, the known methods do not enable the capillary bodies to be symmetrically embedded in a predetermined position.

The present invention eliminates these difficulties and relates to a method of manufacturing filter plugs for tobacco products, particularly for cigarettes, which have continuous capillary ducts located in a filling of filtering material. The method is characterized by the fact that an endless rope is formed of the filling material with embedded capillary ducts by supplying endless bodies of any cross-sectional area provided with capillary ducts to an embedding tool and which are there placed in the desired position relative to the longitudinal axis of the rope while the filling material simultaneously supplied to the embedding tool fills the remaining free cross-section of the rope to be produced. The rope emerging from the embedding tool is given the predetermined outer diameter, provided with a wrap and subdivided into lengths.

The method according to this invention will now be described in greater detail in a number of embodiments with reference to FIGS. 1 through 12 of the drawings attached, in which:

FIG. 1 is a diagram of an embodiment of the method of embedding a capillary body in two ropes of filling material;

FIG. 2 is a cross-section of a filter rope with an embedded capillary body manufactured according to the method according to FIG. 1;

FIG. 3 is a cross-section of a semicircular rope of filling material for use in the method according to FIG. 1;

FIG. 4 is a cross-section of another filter rope manufactured according to the method of FIG. 1;

FIG. 5 shows two longitudinal sections of embodiments of tubular capillary bodies;

FIG. 6 is a perspective view of a tubular capillary body provided with side wall apertures;

FIG. 7 is a diagram of another embodiment of the method of embedding a capillary body in an endless filter rope;

FIG. 8 is a front view of the funnel employed in the method according to FIG. 7;

FIG. 9 is a perspective view of the filter rope with embedded capillary body that can be produced by the method according to FIG. 7;

FIG. 10 is a perspective view of a stellate capillary body;

FIG. 11 is a cross-section of a filter rope with embedded stellate capillary body, and FIG. 12 is a diagram of a further embodiment of the method of embedding a capillary body in an endless filter rope.

A first embodiment of the present method is shown diagrammatically in FIG. 1 and is desgned to produce an endless filter rope of the type shown in cross-section in FIG. 2 which includes two ropes of filling material 10 and 11 in which a capillary body in the shape of a capillary tube 12 is axially embedded. The two ropes of filling material 10 and 11 are semicircular in cross-section as shown in FIG. 3 and are arranged with their flat sides facing each other and combined into a circular filter rope as shown in FIG. 1 by means of an embedding tool (not shown), a capillary tube 12 being inserted between the ropes 10 and 11 in the grooves 13 provided in the two flat sides. The assembled filter rope is moved in the direction of arrow 14 and the two semicircular ropes 10 and 11 and the capillary tube 12 are drawn off appropriate supply drums. This is how an endless filter rope is produced which is commonly wrapped in a strip of paper and can be subdivided into filter rods or filter sections of any length desired. The filtering material of which the two semicircular ropes 10 and 11 are formed may be a plastic material, a plastic foam, strengthened and bonded fibrous materials, longitudinally creped or folded paper webs of the type disclosed, for example, in my Pat. No. 2,995,481 or the like. In the manner described, several—by way of example three—capillary tubes 15, 16, 17 may naturally be embedded in two semicircular resilient ropes of material 10 and 11 in accordance with FIG. 4; if desired, three sector-shaped ropes of material may be employed instead of two semicircular ropes. The endless filter rope according to FIG. 4 is here shown with its wrap 19. Capillary tubes of the shapes shown in FIG. 5 having wider and narrower portions and capillary tubes according to FIG. 6 having elongated or other apparatus 20 in the wall 21 may be employed.

A further embodiment of the method of axially embedding a capillary body in the centre of an endless filter rope is shown in FIGS. 7, 8 and 9. Three webs of material 22, 23 and 24 of the type disclosed, for example, in my Pats. 2,995,481 or 3,179,024 or 2,931,748, drawn off the supply drums 25, 26 or 27 respectively in the direction indicated by arrows are here supplied to a three-sector funnel 28 of which a front view is shown in FIG. 8. The interior of the funnel 28 is subdivided into three sectors 29, 30 and 31 of equal size by three radial partitions. In addition, the three radial partitions carry a tube 32 extending along the axis of the funnel of which the interior diameter corresponds to the capillary body to be introduced. As shown in FIG. 7 the web of material 22 passes into sector 29, the web 23 into sector 30 and the web 24 into the bottom sector 31 of the funnel. The capillary tube 34 supplied from the drum 33 is inserted in the axial tube 32 of the funnel. The three radial partitions in the funnel and the guide tube 32 they support extend not to the end of the funnel but over a sufficient length in order to assemble the three webs of material 22, 23 and 24 to correspondingly shaped ropes so that a filter rope 35 emerges from the end of the funnel which has the shape diagrammatically shown in FIG. 9. This rope is of an overall circular cross-section shown in FIG. 9 but comprises the three sector-shaped portions 36, 37 and 38 formed by gathering the material webs 22, 23 and 24. Located in the centre of the three sectors and virtually coaxially with the rope axis is the capillary body here designed as a capillary tube 39. The filter rope 35 is supplied to the funnel of a well known rod former machine (not shown) and wrapped with a paper band in the usual manner. If suitable webs of material 22, 23 and 24 are employed, e.g. suitable amounts of longitudinal creped paper or self-supporting woven or unwoven fibre strands, it can be ensured that the filling in the sectors 36, 37 and 38 of the rope 35 either is compacted sufficiently to exercise such a degree of flow resistance relative to that of the capillary tube 39, that desired amounts of the smoke will pass through the capillary tube 39 and the gas-previous filling, respectively, in a filter section. Obviously it is also possible to supply loose fibre strands to the three sectors 29, 30 and 31 of the funnel 28 instead of the flat webs of material 22, 23 and 24 so that an endless filter rope is formed of which the inside is provided with the capillary tube 39 or some other capillary body located coaxially with the axis of the rope. The single capillary tube 34 shown in FIG. 7 can naturally also be replaced by several, possibly braided, capillary tubes or capillary bodies 40 according to FIG. 10 having three narrow U-shaped open sided capillary ducts 41, 42, 43, which are inserted in the central tube of the funnel 28 so that an endless filter rope having several capillary ducts in its interior located symmetrically with the rope axis is formed. It is further possible to force into the three sectors 29, 30 and 31 of the funnel 28 freshly manufactured plastic foams which are still in plastic condition in order to produce an endless filter rope with a foam filling and one or several centrally arranged capillary ducts. The endless rope emerging from the funnel 28 is normally wrapped in a strip of paper or the like.

The device disclosed with reference to FIGS. 7 through 9 may naturally be manufactured with a funnel 28 subdivided into only two halves or with a subdivision into more than three sectors.

If loose fibre strands are introduced into the three sectors 29, 30 and 31 of the funnel 28 of the device according to FIG. 7, no sectors are commonly visible in the filling of the endless filter rope produced. In that case, any capillary bodies can be supplied to the central tube 32 of the funnel 28; by way of example, an endless rope having the cross-section according to FIG. 11 may be produced in this manner, the said rope having a stellate capillary body 44 with four narrow U-shaped open sided capillary ducts in a wrap 46, the said body 44 being coaxially embedded in the homogeneous fibre material 45.

In the art of manufacturing filter plugs for filter-tip cigarettes it is customary to produce endless filter ropes to be subdivided into so-called filter rods having a length according to six filter plugs. Such filter rods are fed into cigarette making machines and subdivided in subsequent steps to make filter tips for the cigarettes. Suitable filter rods have to accomplish the desired demands in respect of diameter, overall length, and the so called draw resistance measured as pressure drop of air flowing through the filter rod. To adjust the demanded draw resistance for a desired type of filter rods, using for example an apparatus as disclosed in my Pat. 3,161,557, a raw paper web of about 35 grams weight per square meter is used having a width of about 22 cm.; the draw resistance of the resulting filter rods is checked and if the draw resistance is to be increased or decreased, a broader or narrower raw paper web is chosen. A fine adjustment of the draw resistance is accomplished by a more or less deep grooving treatment of the raw paper web. An experienced operator of such an apparatus knows very well the amount of material necessary as a filling for a filter rod to get the desired draw resistance.

An equal amount of filling material is necessary to produce a filter rope according to the method described above in connection with FIGS. 7 to 9. The raw paper web may be prepared as disclosed, for example, in my Pat. 3,179,024 and wound on three bobbins to be used as drums 25, 26 and 27 in FIG. 7. If desired it is possible to prepare first some rod samples without any embedded body 34 to check the draw resistance; if necessary the drums 25, 26 and 27 have to be replaced by broader or narrower drums to get filter rods showing the desired draw resistance. This draw resistance is not much changed as soon as the capillary body 34 is embedded into the same filling of the filter rope. The relations are shown in the following example.

EXAMPLE

Filter rods having a diameter of 8.0 mm. and a length of 66 mm. have been formed by feeding into the funnel 28 of FIG. 7 three grooved paper webs each 75 mm. wide and produced as disclosed in my Pat. 3,179,024 from a raw paper web having a weight of 33 grams per square meter and a width of 240 mm. The grooved paper web was provided with 10 to 11 grooves per 10 mm. width each of about 0.4 mm. depth. Without an embedded capillary body a draw resistance was measured of about 143 mm. with an air flow of 1130 cubic centimeters per second. Using the same filling and embedding a round capillary tube of 1.0 mm. inner diameter and 2.0 outer diameter the filter rods showed a draw resistance of 67.5 mm. Closing the capillary duct of the tube resulted in a draw resistance of about 179 mm.

The filter rods prepared according to the above-mentioned example showed a retention of 44% of the corpuscular components of cigarette smoke when used as filter plugs of 11 mm. length on filter-tip cigarettes.

What is claimed is:
1. A method of manufacturing filter ropes of a predetermined diameter adapted to be subdivided into filter plugs for tobacco products, particularly for cigarettes, the steps comprising: continuously and progressively assembling a plurality of substantially endless lengths of gas-permeable filtering material longitudinally about at least one substantially endless core having at least one unobstructed capillary duct extending longitudinally thereof but other than said duct being gas-impermeable; continuously shaping the assembly of the filtering material and core into a generally cylindrical rod-like configuration of the predetermined diameter; adjusting the cross-sectional area of the lengths of filtering material being assembled to preserve continuously along the running length thereof the gas-permeability of the filtering material but minimize the formation of unobstructed longitudinal channels therebetween or therein; and enclosing the cylindrical assembly in a wrapper.

2. The method defined in claim 1 in which each length of filtering material is at least one web of longitudinally creped paper.

3. The method defined in claim 1 in which the lengths of filtering material are of preformed sector shape in cross-section to generally conform to each other, to the core and to the cylindrical configuration of the assembly.

4. The method defined in claim 1 in which the core is of tube-like configuration.

5. The method defined in claim 1 in which the duct is of varying cross-sectional area along its length.

6. The method defined in claim 1 in which the duct has an open side.

References Cited

UNITED STATES PATENTS

| | | | |
|---|---|---|---|
| 2,854,985 | 10/1958 | Watkins | 131—10 |
| 2,954,773 | 10/1960 | Lebert | 131—216 |
| 3,091,019 | 5/1963 | Wetterau | 264—174 |
| 3,232,294 | 2/1966 | Orsino et al. | 131—268 |
| 2,694,661 | 11/1954 | Meyer | 156—441 |
| 2,994,327 | 8/1961 | Otto et al. | 264—47 |
| 3,346,682 | 10/1967 | Thomson | 264—119 |

ROBERT F. WHITE, Primary Examiner

J. R. THURLOW, Assistant Examiner

U.S. Cl. X.R.

131—10, 216, 268; 156—441; 264—174